United States Patent

[11] 3,577,712

| [72] | Inventors | Peter Ballennie deceased, late of West Hill<br>Eileen Margaret Ballennie, Executrix, West Hill, Ontario, Canada; Angelo P. Ruffo, Montreal, Canada |
|---|---|---|
| [21] | Appl. No. | 829,163 |
| [22] | Filed | May 28, 1969 |
| [45] | Patented | May 4, 1971 |
| [73] | Assignee | Industrial Air Filters Limited<br>Continuation-in-part of application Ser. No. 683,197, Nov. 15, 1967, now abandoned. |

[54] COMBINATION AIR FILTER AND FRAME FOR HOLDING THE SAME
1 Claim, 3 Drawing Figs.

[52] U.S. Cl. .................................................... 55/501, 55/511
[51] Int. Cl. ...................................................... B01d 46/10
[50] Field of Search .......................................... 55/501, 495, 502—504, 511

[56] References Cited
UNITED STATES PATENTS

| 3,076,303 | 2/1963 | Durgeloh...................... | 55/511 |
| 3,127,695 | 4/1964 | Driscoll et al................ | 55/FF |
| 3,142,550 | 7/1964 | Kuehne........................ | 55/495 |
| 3,293,834 | 12/1966 | Donachiue.................... | 55/501 |
| 3,373,546 | 3/1968 | Setnan......................... | 55/511 |

FOREIGN PATENTS

| 998,146 | 7/1965 | Great Britain................ | 55/495 |

*Primary Examiner*—Frank W. Lutter
*Assistant Examiner*—Bernard Nozick
*Attorneys*—Alexander T. Kardos and Robert L. Minier

ABSTRACT: A frame comprising plural frame members in rectangular configuration for removably mounting air filter media. Each frame member has a base and a resilient wall in spaced apart relationship. A rigid finger extends downwardly from the rigid wall towards the resilient wall so that air filter media is gripped between the finger wall and the resilient wall. The frame member has a flange as an extension of the base portion.

PATENTED MAY 4 1971          3,577,712

INVENTORS:
PETER BALLENNIE
ANGELO P. RUFFO
BY
Robert T. Mince
ATTORNEY.

COMBINATION AIR FILTER AND FRAME FOR HOLDING THE SAME

The present application is a continuation-in-part application of our copending application Ser. No. 683,197, filed Nov. 15, 1967 now abandoned.

This invention relates to a frame for removably mounting air filter media and in particular to a frame member or connector having new and novel features which provide a convenient manner of mounting the connector in place in an air duct and for mounting the air filter media in the connector.

In the present application the terms "frame member" and "connector" are used interchangeably.

The connectors presently in use comprise a hollow body, made of plastic material of a rigid nature for receiving an edge portion of the filter media, said body having a longitudinal base attachable to a support means, sidewalls rising from the base and a resilient blanket gripping member carried by each wall and sloping downwardly towards the opposite wall, said gripping members being in opposed relationship and having their opposed edges forming a blanket receiving slot, whereby, when the edge portion of the blanket is being inserted through the said slot into said body, said resilient blanket gripping members move downwardly and, after insertion, said blanket gripping members releasably lock the edge portion in said pocket, the blanket being removed by an upward pull thereon, the resilient blanket gripping members flexing upwardly to release their grip.

The connector referred to in the preceding paragraph has several disadvantages. It first did not provide any convenient means for fastening the connector to the support means since the fastening means had to be inserted through holes formed in the bottom of the channel and such insertion was obstructed by the pair of blanket gripping strips. Furthermore, that type of connector was difficult to join at corners such as by butt joints and the mounting frames required special arrangements at each corner.

Another disadvantage of the connectors presently in use is that they reduced, because of their size, some of the air filter area.

It is therefore an object of the present invention to provide a connector which will overcome the foregoing and other disadvantages and this is accomplished by the connector to be described in the following disclosure and illustrated by the accompanying drawings which show the preferred embodiment of the connector.

Figure 1:
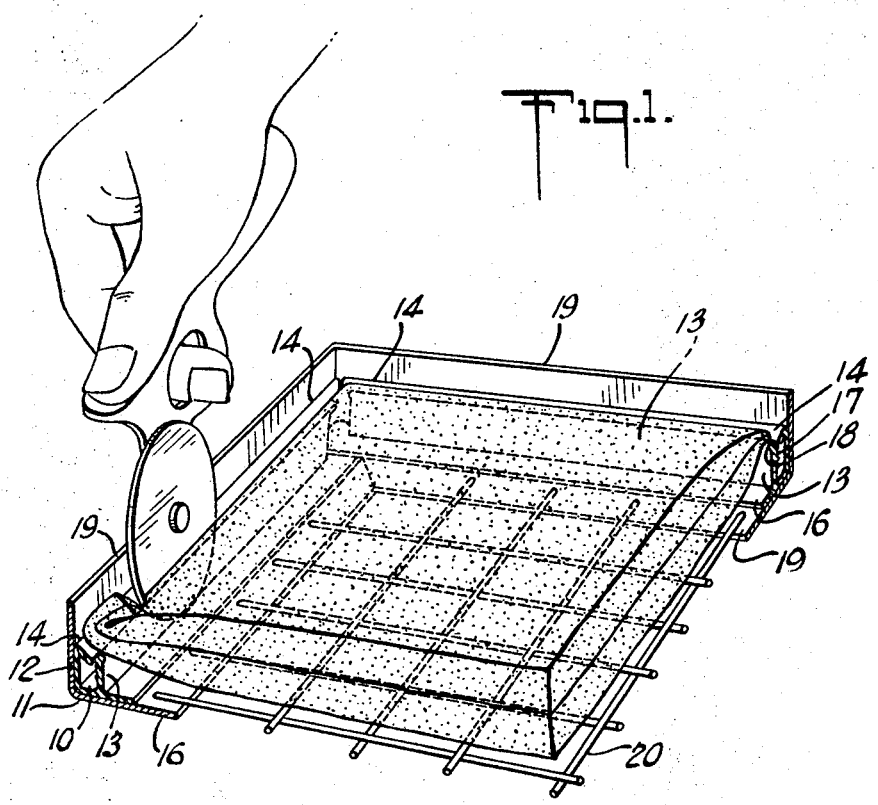
FIG. 1 is a perspective view of a connector constructed according to the present invention.

The connector for removably mounting the air filter media in place in an air-filtering duct comprises a channel 10, defined by a base 11 and a rigid wall 12 and a resilient wall 13, said walls being in spaced-apart relationship. A rigid finger 14 is formed integrally with the rigid wall and sloped downwardly toward the resilient wall with its free end 15 stopping short of the resilient wall 13 to form a gap through which the media is entered and gripped between the finger and the resilient wall. For ease in inserting the media between the gap and into the channel by means of a suitable roller, the finger is preferably sloped at an angle of about 30°. The purpose of the slope is to guide the tool into the gap. It will be apparent that when the air filter media is placed on top of the connector that the position of the gap will not be in view. When the tool as shown is placed on top of the air filter media to force the same into the gap and into the channel 10, the slope of the finger will guide the tool into the gap.

The base 11 is extended beyond this wall 13 to provide a mounting flange 16. The wall 13 may have its inner face serrated as shown at 17 in juxtaposition relative to the free end of the rigid finger to provide additional grip on the edge of the air filter media. The top of the wall 13 may also be provided with a bead 18. The wall 13 has sufficient flexibility to yield when the material and tool are inserted through the gap between the free end 15 and the wall 13.

Figure 2:
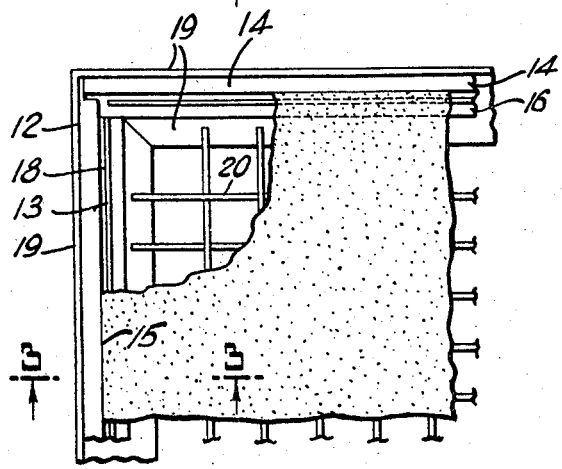
FIG. 2 is a front elevation showing the connector mounted in place on a steel or aluminum support, in the form of angles, which are mounted in the air duct.
Figure 3:
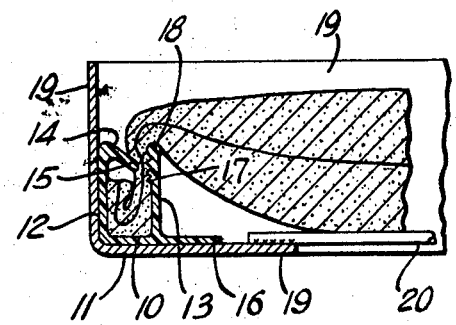
FIG. 3 is an enlarged cross section on the line 3-3 of FIG. 2.

Referring now to FIG. 2 and FIG. 3, it will be seen that there is provided in the air duct (not shown) a rectangular support made of angle members 19.

The connectors are mounted in the angle with the wall 12 placed firmly against one side of the angle and the flange 16 against the other side of the angle with the top of the connector facing into the air flow. It will thus be seen that the base 11, flange 16 and rigid wall 12 are rigidly fixed in position and have no flexibility. Likewise the rigid finger 14 has no flexibility since the entry of the tool and the edge of the material is accomplished through the slight flexibility of the wall 13. The flange 16 is secured by means of gluing or riveting whichever is preferred.

The angle members also carry a backup mesh 20 which is s welded to the angles and supports the media when it is subjected to air pressure flowing through it in the direction of the arrow indicated in FIG. 3.

The frame members are connected in end to end relation to form a rectangular frame having opposed planar faces. The base portion of all the frame members lie in the same plane and all of the slots for receiving the air filter material lie in the other plane. The air filter is compressed and held in the slot by the rigid finger and resilient wall previously described and the air filter is substantially uncompressed when it is not gripped.

THe material of which the connector is made should be capable of withstanding a temperature in the range of −40° F. to +330° F. continuously without distortion. A suitable material for this purpose is polycarbonate.

We claim:

1. In combination a frame comprising a plurality of frame members connected in end to end relation to form a rectangular configuration, said frame having first and second opposed planar faces, each of said frame members comprising a channel, each said channel being defined by a base lying in said first face, a rigid outer wall and a resilient inner wall in spaced apart relationship and integrally connected to the base and each wall projecting normally from said base towards said second face, the top of said walls lying substantially in said second face, the resilient wall being disposed from a lateral inner edge of said base whereby a mounting flange is formed integral with and as an extension to said base, said rigid wall having a rigid finger formed integrally with said rigid wall and sloping downwardly toward the resilient wall and having its free end stopping short of the resilient wall to define a narrow slot, said resilient wall being provided with serrations on the surface thereof facing said rigid finger and said resilient wall having its top end formed with a bead, and a flat batt of flexible resiliently compressible filter material substantially thicker in its uncompressed state than the width of the mouth of said slot disposed as a layer across said second face of said frame and having perimeter portions thereof extending into said slot said perimeter filter material portions being compressed and gripped between said rigid finger and said resilient wall and being substantially uncompressed where not so gripped a rectangular outer frame having an L-shaped cross section defining sidewall and bottom wall, the bottom wall being planar and having a central opening, the mounting flanges of the frame members being secured to the bottom wall of the outer frame about the central opening.